United States Patent

Kaneko

(10) Patent No.: US 7,014,214 B2
(45) Date of Patent: Mar. 21, 2006

(54) RESINOUS CONNECTOR

(75) Inventor: Kenichiro Kaneko, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/878,573

(22) Filed: Jun. 29, 2004

(65) Prior Publication Data

US 2005/0029809 A1    Feb. 10, 2005

(30) Foreign Application Priority Data

Aug. 4, 2003   (JP) ............................. 2003-286057

(51) Int. Cl.
*F16L 3/04* (2006.01)
(52) U.S. Cl. .................... 285/141.1; 285/239
(58) Field of Classification Search ............ 285/141.1, 285/136.1, 239, 240, 259, 379; 137/43, 202, 137/197, 198; 55/350.1, 355
See application file for complete search history.

(56) References Cited

U.S. PATENT DOCUMENTS

| 4,039,212 | A | * | 8/1977 | Skarud ..................... 285/253 |
| 5,096,231 | A | * | 3/1992 | Chisnell et al. ............ 285/55 |
| 5,443,098 | A |   | 8/1995 | Kertesz |
| 5,879,033 | A | * | 3/1999 | Hansel et al. .............. 285/239 |
| 6,408,867 | B1 | * | 6/2002 | Aoki et al. .................. 137/202 |
| 6,733,048 | B1 | * | 5/2004 | Kurihara et al. ............ 285/423 |
| 6,755,206 | B1 | * | 6/2004 | Nishi et al. ................. 137/202 |
| 6,843,268 | B1 | * | 1/2005 | Yamada et al. ............. 137/202 |
| 6,854,477 | B1 | * | 2/2005 | Yamada et al. ............. 137/202 |

FOREIGN PATENT DOCUMENTS

| JP | A-6-270701 | 9/1994 |
| JP | A-2002-160537 | 6/2002 |
| JP | A-2002-293144 | 10/2002 |

* cited by examiner

*Primary Examiner*—David Bochna
(74) *Attorney, Agent, or Firm*—Posz Law Group, PLC

(57) ABSTRACT

A resinous connector includes a flange-shaped base, a nipple, an O-ring, and an O-ring groove. The nipple extends from the base, and has an outer peripheral surface and sealing projections disposed on the outer peripheral surface. The sealing projections have a substantially triangle-shaped cross section whose diameter reduces in the direction away from the base. The O-ring is disposed between the nipple and a hose. The O-ring groove is formed at a root of the nipple in the outer peripheral surface, and is disposed at a position closer to the base than the sealing projection disposed in most proximity to the base. The resinous connector can inhibit the O-ring from being twisted or bruised by the hose.

7 Claims, 2 Drawing Sheets

RESINOUS CONNECTOR

BACKGROUND OF THE INVENTION

1. Field of the Invention

The present invention relates to a resinous connector which is welded to resinous containers having an opening so as to cover the opening, and whose leading end is fitted into a hose by press-in fitting and is fastened thereto. A resinous connector according to the present invention can be used as connectors for cut-off valves which are disposed in resinous fuel tanks, and as connectors for breather tubes.

2. Description of the Related Art

Fuel tanks boarded on automobiles have been more and more made of resin in view the lightweight requirement. Fuel tanks are required to prohibit fuels from permeating. Accordingly, it is necessary to use resinous materials, whose gas-barrier property is good, for making fuel tanks. As a resin whose gas-barrier property is appropriate for the application, polyamide resins have been known. However, polyamide resins have a disadvantage in that they might be insufficient in terms of strengths such as shock resistance. Hence, Japanese Unexamined Patent Publication (KOKAI) No. 2002-160,537, for example, discloses a two-layered fuel tank in which a polyamide resin which is good in terms of the gas-barrier property is laminated with a polyethylene resin which is good in terms of the shock resistance as well as the weldablity to other component parts. In the two-layered fuel tank the polyamide resin makes the inner layer, and the polyethylene resin makes the, outer layer.

Moreover, it is necessary to fasten various resinous component parts, such as cut-off valves, valves for detecting filled-up fuel tanks, filler pipes and breather pipes, to automotive fuel tanks. In this instance, when a fuel tank has an outer layer made of a polyethylene resin and a resinous component part is formed of a polyethylene resin at least at the portions to be fastened to the fuel tank, it is preferable because the resinous component part can be fastened to the fuel tank by welding and the sealing property is improved remarkably between the resinous component part and the fuel tank.

Japanese Unexamined Patent Publication (KOKAI) No. 2002-293,144, for instance, discloses such a resinous component part. It has been known that the resinous component part comprises a body which is composed of a gas-impermeable resin such as polyamide resins, at least a part of which is covered with an adhesive resinous material such as high-density polyethylene resins. The resinous component part is used in the following manner: the cover layer composed of the adhesive resinous material is welded to fuel tanks; and the nipple composed of the gas-impermeable resin is fitted into hoses by press-in fitting. Moreover, Japanese Unexamined Patent Publication (KOKAI) No. 6-270,701 discloses a pipe fitting which comprises a portion to be welded to fuel tanks, the portion being composed of a high-density polyethylene resin, and a fitting bonded to the leading end of the portion and composed of a polyamide resin. The thus constructed resinous component parts can be fastened by welding to fuel tanks, and can securely inhibit fuels from permeating through the fastened parts. In addition, since the polyamide resin exhibits good creep resistance, the resinous component parts can maintain high reliability for a long period of time in service such as when the fitting or nipple is fitted into hoses.

However, when the regulation pertaining the fuel permeation is strict, resinous component parts whose nipple is formed of polyamide resins might be insufficient in terms of the sealing property when the connector is simply fitted into hoses by press-in fitting. Accordingly, it has been a usual practice conventionally to hold an O-ring at the leading end of the nipple and have the O-ring pressed onto the hoses and nipple, thereby securing the sealing property.

However, when resinous component parts are constructed so that an O-ring is held to the leading end of the nipple, the O-ring is rubbed in the period of from the initial press-in fitting to the final press-in fitting into hoses. Accordingly, O-rings might be twisted or bruised. Consequently, various countermeasures have been devised, for example, reducing the thickness of O-rings, or forming the cross-section of O-rings anomalously, If such is the case, however, no further improvement of the sealing property can be expected because the tightening allowance of O-rings has become smaller. Thus, the problem of increased cost has arisen because no standard O-rings can be applied to resinous component parts.

Moreover, the connector composed of polyamide resins exhibits low shock resistance. Accordingly, in resinous component parts whose nipple projects perpendicularly to the surface of fuel tanks, a problem occurs in that there are many limitations in designing the resinous component parts, because stresses concentrate at the root of the nipple so much that the nipple might break at the root. Consequently, it is possible to think of covering the surface of the nipple with polyethylene resins which exhibit high toughness. In this instance, however, a problem arises in that the load for pulling out hoses has lowered gradually because the cover layer composed of polyethylene resins is fatigued by stresses.

SUMMARY OF THE INVENTION

The present invention has been developed in view of the aforementioned circumstances. It is therefore an object of the present invention to let resinous component parts demonstrate higher sealing property by means of an O-ring and to simultaneously inhibit O-rings from being twisted or bruised. It is a further object of the present invention to let resinous component parts keep the load for pulling out hoses from lowering. It is a furthermore object of the present invention to inhibit the nipple of resinous component parts from breaking.

In an aspect of the present invention, a resinous connector can solve the aforementioned problems, and comprises;

a flange-shaped base welded to a resinous container having an opening so as to cover the opening;

a nipple extending from the base, fitted into a hose by press-in fitting, and having an outer peripheral surface fastened to the inner peripheral surface of the hose and sealing projections disposed on the outer peripheral surface, the sealing projections having a substantially triangle-shaped cross section whose diameter reduces in the direction away from the base;

an O-ring disposed between the outer peripheral surface of the nipple and the inner peripheral surface of the hose, and sealing therebetween; and an O-ring groove formed at a root of the nipple in the outer peripheral surface thereof, and disposed at a position closer to the base than the sealing projection disposed in most proximity to the base.

In the present resinous connector, the O-ring groove can preferably have a surface disposed continuously from a surface of the sealing projection disposed in most proximity to the base.

In another aspect of the present invention, a resinous connector can likewise solve the aforementioned problems, and comprises:

a flange-shaped base welded to a resinous container having an opening so as to cover the opening;

a nipple extending from the base, fitted into a hose by press-in fitting, and having an outer peripheral surface fastened to the inner peripheral surface of the hose and sealing projections disposed on the outer peripheral surface, the sealing projections having a substantially triangle-shaped cross section whose diameter reduces in the direction away from the base;

an O-ring disposed between the outer peripheral surface of the nipple and the inner peripheral surface of the hose, and sealing therebetween;

the base comprising an outer periphery, and the nipple comprising a root extending from the base and having an outer periphery, at least the outer periphery of the base and the outer periphery of the root being formed of a first resin which is weldable to the container; and the nipple further comprising a leading portion disposed ahead of the root, at least the leading portion being formed of a second resin whose rigidity is higher than that of the first resin, and an O-ring groove formed in a surface adjacent to the root of the nipple or in the surface of the root.

When the central axis of the nipple is substantially parallel to the central axis of the base, the root of the nipple can desirably comprise an inner periphery being formed of the second resin in addition to the outer periphery being formed of the first resin.

Moreover, the base can desirably comprise an inner periphery being formed of the second resin in addition to the outer periphery being formed of the first resin.

In addition, the O-ring groove of the nipple can desirably comprise a bottom being covered with the first resin.

Thus, in accordance with the present resinous connector, the O-ring is installed in the O-ring groove which is formed in a surface adjacent to the root of the nipple or in the surface of the root. Therefore, when press-in fitting the nipple of the present resinous connector into hoses, the O-ring does not contact with hoses from the initial press-in fitting period to the intermediate press-in fitting period at all, but is rubbed therewith in the final press-in fitting period only. Accordingly, it is possible to inhibit the O-ring from being twisted or bruised because the time period during which the O-ring is rubbed is diminished. Consequently, the present resinous connector can demonstrate a higher sealing property. Moreover, when the O-ring groove is formed at the root of the nipple, it is possible to reduce the overall length of the nipple, because a surface of the O-ring groove can be disposed continuously from a surface of the sealing projection disposed in most proximity to the base.

Further, when the root of the nipple comprises the outer periphery being formed of the first resin and the inner periphery being formed of the second resin, it is possible to inhibit the root from breaking because the first resin of high toughness is employed. Furthermore, even if the inner periphery being formed of the second resin should have broken, it is possible to avoid such a drawbacks that fuels leak through the nipple, because the first resin keeps covering the root at the outer periphery.

Moreover, when the base comprises the outer periphery being formed of the first resin and the inner periphery being formed of the second resin, the present resinous connector can demonstrate a higher gas-barrier property while being weldable to the container such as fuel tanks.

In addition, when the O-ring groove of the nipple is constructed to comprise a bottom, being covered with the first resin, the first resin upgrades the sealing property between the present resinous connector and hoses by way of the O-ring.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
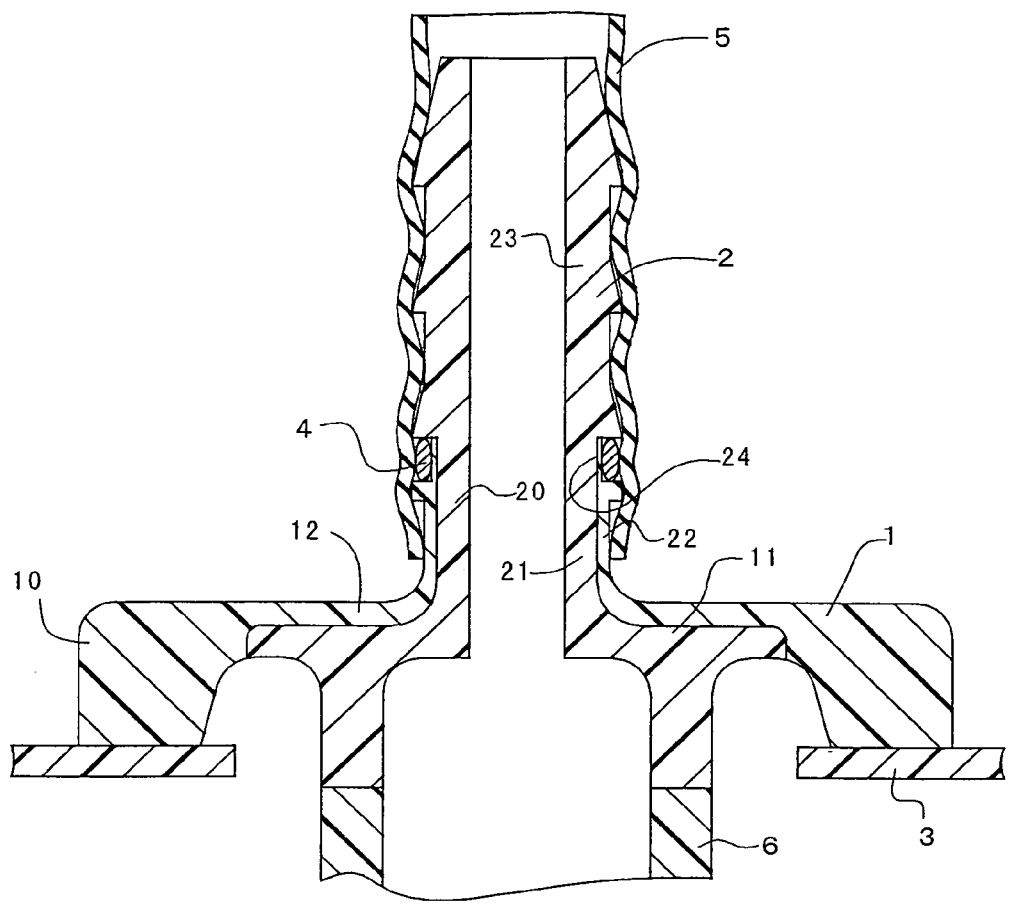
FIG. 1 is a cross-sectional view for illustrating a resinous connector according to Example No. 1 of the present invention which is fastened to a fuel tank, is equipped with an O-ring, and is fitted into a hose by press-in fitting.

Having generally described the present invention, a further understanding can be obtained by reference to the specific preferred embodiments which are provided herein for the purpose of illustration only and not intended to limit the scope of the appended claims.

The present resinous connector comprises a flange-shaped base, a nipple, and an O-ring. The base is welded to a resinous container having an opening so as to cover the opening. The nipple extends from the base, is fitted into a hose by press-in fitting, and has an outer peripheral surface fastened to the inner peripheral surface of the hose and sealing projections disposed on the outer peripheral surface. The sealing projections have a substantially triangle-shaped cross section whose diameter reduces in the direction away from the base. The O-ring is disposed between the outer peripheral surface of the nipple and the inner peripheral surface of the hose, and seals therebetween. Moreover, the base comprises an outer periphery, the nipple comprises a root extending from the base and having an outer periphery, and at least the outer periphery of the base and the outer periphery of the root are formed of a first resin which is weldable to the container. In addition, the nipple further comprises a leading portion disposed ahead of the root, at least the leading portion is formed of a second resin whose rigidity is higher than that of the first resin, and an O-ring groove is formed in a surface adjacent to the root of the nipple or in the surface of the root.

Here, the root designates a part of the nipple. Specifically, it refers to a portion of the nipple neighboring the base, or the trailing end thereof.

As for the first resin, it is possible to use resins which are weldable to the container and whose rigidity is lower than that of the second resin. For example, when the container is automobile fuel tanks, it is desirable to use the same kind of resins as the superficial resin of automobile fuel tanks. Specifically, it is possible to use high-density polyethylene resins and acid-modified polyethylene resins. At least the outer periphery of the base and the outer periphery of the root extending from the base are formed of the first resin. When the outer periphery of the base is formed of the first resin, it is possible to weld the base to the container so as to enclose the opening of the container. Accordingly, the present resinous connector can demonstrate a high gas-barrier property. Moreover, when the outer periphery of the root is formed of the first resin, it is possible to inhibit the root from breaking. Consequently, it is possible to inhibit gases from leaking even if the inner periphery of the root should have broken.

As for the second resin, it is possible to use resins whose rigidity is higher than that of the first resin. For instance, when the container is automobile fuel tanks, it is desirable to use polyamide resins whose rigidity is higher than that of high-density polyethylene resins and acid-modified polyethylene resins, which are good in terms of the gas-barrier property, and which can bond chemically to the first resin. When the leading portion of the nipple disposed ahead of the root is formed of the second resin, it is possible to inhibit the leading portion from fatiguing, leading portion which is fitted into the hose by press-in fitting. That is, when the leading portion is fitted into the hose, a fastening force acts onto the nipple from the hose as a repulsive force of the press-in fitting. In this instance, the hose can exert the repulsive force more effectively, because the leading portion of the nipple is formed of the high-rigidity second resin. Consequently, it is possible to keep the load for pulling out the hose from lowering.

It is necessary to form the outer periphery of the base of the first resin, but it is desirable to form the inner periphery thereof of the second resin which exhibits a gas-barrier property. It is possible to form the entire base excepting the outer periphery of the second resin. However, note that it is necessary to form the outer peripheral surface of the root of the nipple out of the first resin. Hence, it is desirable to make the inner periphery of the base into a two-layered construction in which one of the opposite surfaces extending from the outer peripheral surface of the root is formed of the first resin and the other one of the opposite surfaces is formed of the second resin.

The O-ring groove can be formed in a surface of the nipple adjacent to the root thereof, surface which is formed of the second resin alone. However, it is desirable to form the O-ring groove in a surface of the root whose outer peripheral surface is formed of the first resin. With such an arrangement, the sealing reliability effected by the O-ring is furthermore enhanced, because the O-ring seals the interface of the first and second resins at the outer end with respect to the container. As a result, it is possible to inhibit such a drawback that fuels within the tank permeate out through the outer boundary between the present resinous connector and the tank by way of the interface between the first resin and the second resin.

The length from the base to the inner or lower opposite surface of the O-ring groove can desirably be from 5 to 20 mm, further desirably from 10 to 15 mm. When the length is too short, the allowance of the hose covering the O-ring becomes so small that the tightening or clamping force exerted by the hose lowers. As a result, there might arise cases where it is not possible to secure a predetermined sealing property. When the distance is too long, the overall length of the nipple becomes so long that the moldability of the nipple might deteriorate.

EXAMPLES

The present invention will be hereinafter described in more detail with reference to specific examples. Note that the present invention is applied to a connector for cut-off valves which are fastened to automobile fuel tanks, or a connector for breather tubes, in the present examples.

Example No. 1

Figure 2:
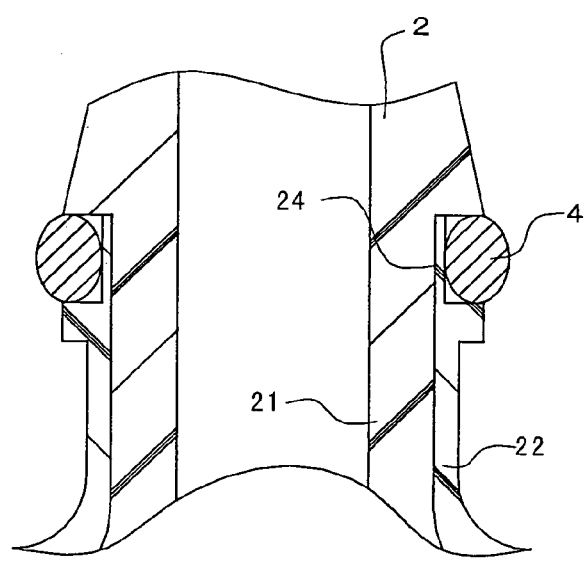
FIG. 2 is an enlarged cross-sectional view for illustrating a major portion of the resinous connector according to Example No. 1 with the O-ring equipped.

FIG. 1 illustrates a resinous connector according to Example No. 1 of the present invention, which is fastened to a fuel tank 3, which is equipped with an O-ring 4, and which is fitted into a hose 5 by press-in fitting, as the cross-sectional view. FIG. 2 illustrates an enlarged cross-sectional view when the resinous connector according to Example No. 1 is equipped with the O-ring 4.

The resinous connector comprises a flange-shaped base 1, and a fur tree-shaped nipple 2 which projects from the base 1. An outer periphery 10 of the base 1 is formed of an acid-modified polyethylene resin alone. Further, an inner periphery of the base 1 comprises a base inner layer 11 being formed of a polyamide resin, and a base outer layer 12 being formed of the acid-modified polyethylene resin. Furthermore, the base inner layer 11 is formed as a cylinder shape, and is fastened by welding to a functional component part 6 such as the housing of cut-off valves. Moreover, a root 20 of the nipple 2 comprises a root inner layer 21 being formed of the polyamide resin, and a root outer layer 22 being formed of the acid-modified polyethylene resin. In addition, a leading portion 23 of the nipple 2, a portion thereof excepting the root 20, is formed of the polyamide resin alone.

An annular O-ring groove 24 is formed in the leading-end surface of the root 20. The O-ring groove 24 comprises a bottom surface or perpendicular surface in the drawing and opposite wall surfaces or opposite horizontal surfaces therein. Moreover, the surface of the O-ring groove 24 is disposed continuously from the surface of one of sealing projections which is disposed in most proximity to the base 1. Note that the bottom surface and one of the opposite wall surfaces (or the lower horizontal surface in the drawing) are formed of the acid-modified polyethylene resin, and the other one of the opposite wall surfaces (or the upper horizontal surface in the drawing) is formed of the polyamide resin.

The resinous connector is formed by so-called 2-color molding. Specifically, the outer periphery 10 of the base 1, the base outer layer 12 and the root outer layer 22 are formed by injection molding with the acid-modified polyethylene resin. While the resulting semi-formed product is disposed in a mold, the base inner layer 11, the root inner layer 21 and the leading portion 23 of the nipple 2 are formed by injection molding with the polyamide resin. In this instance, the heat of molten polyamide resin lets the acid-modified polyethylene resin adhere to the polyamide resin chemically, thereby completing the resinous connector according to Example No. 1 in which both resins are bonded integrally.

The resultant resinous connector is fastened by welding to the fuel tank 3, whose surface is formed of the acid-modified polyethylene resin, at the outer periphery 10 of the base 1. Then, an O-ring 4 is installed in the O-ring groove 24, and the nipple 2 is fitted into a hose 5 by press-in fitting, beginning with the leading portion 23. Note that the O-ring groove 24 is formed in the root 20. Accordingly, the hose 5 does not contact with the O-ring 4 between the initial and intermediate press-in fitting periods, but rubs the O-ring 4 in the final press-in fitting period only. Consequently, the time period during which the O-ring 4 is rubbed is diminished. Therefore, it is possible to inhibit the O-ring 4 from being twisted or bruised. As a result, the resinous connector can demonstrate a higher sealing property.

Further, the bottom surface of the O-ring groove 24 is formed of the acid-modified polyethylene resin which exhibits high toughness. Accordingly, the O-ring 4 seals the interface between the acid-modified polyethylene resin and the polyamide resin at the outer end with respect the fuel tank 3. Consequently, it is possible to furthermore enhance the sealing reliability effected by the O-ring 4.

Furthermore, most of the hose 5 is pressed to contact with the leading portion 23 of the nipple 2 made of the polyamide resin, and the hose 5 is pressed to contact with the root outer layer 22 made of the acid-modified polyethylene resin minimally. Accordingly, the leading portion 23 is inhibited from fatiguing, and thereby the load for pulling out the hose 5 is kept from lowering, contrarily to the instance that the leading end portion 23 is formed of the acid-modified polyethylene resin, a first resin. Moreover, the outer periphery of the root 20 and the inner periphery of the base 1 are formed of the acid-modified polyethylene resin of high toughness. Consequently, the root 20 is inhibited from breaking when stresses concentrate on the base or lower-end of the root 20. In addition, even if the root inner layer 21 of the root 20 made of the polyamide resin should have broken, the root outer layer 22 made of the acid-modified polyethylene resin does not break. Thus, no such drawbacks occur that gases within the fuel tank 3 have leaked through the root 20 to the outside.

Modified Versions

Figure 3:
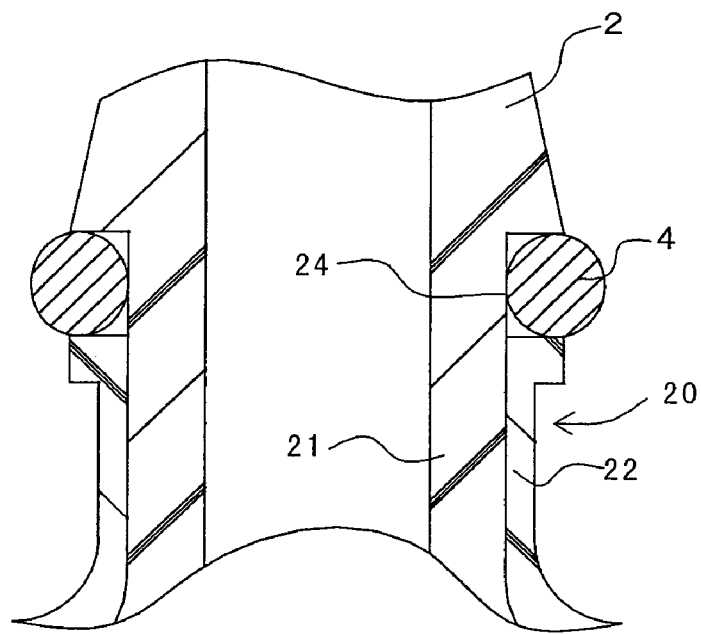
FIG. 3 is an enlarged cross-sectional view for illustrating a major portion of a resinous connector according to Example No. 2 of the present invention with an O-ring equipped.
Figure 4:
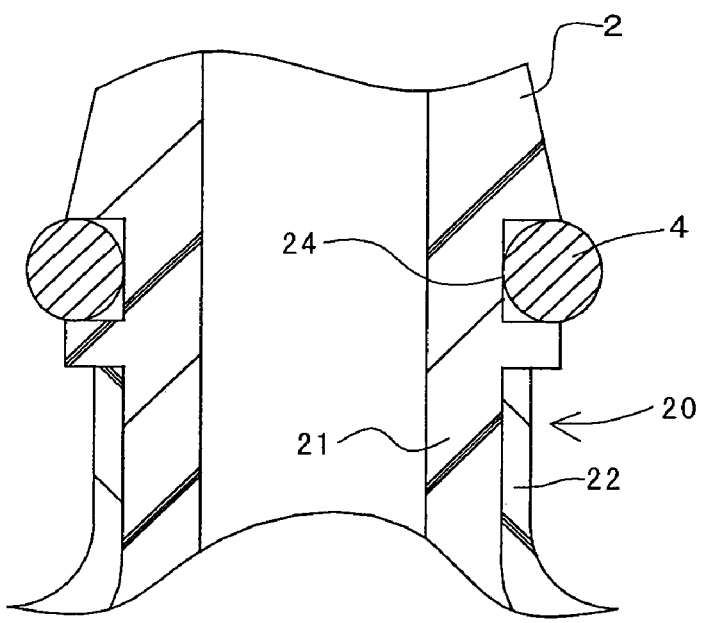
FIG. 4 is an enlarged cross-sectional view for illustrating a major portion of a resinous connector according to Example No. 3 of the present invention with an O-ring equipped.

FIGS. 3 and 4 illustrates resinous connectors according to Example Nos. 2 and 3 of the present invention as their cross-sectional views taken equivalently to that of FIG. 2. The resinous connector according to Example No. 2 is constructed in the same manner as Example No. 1, except that the O-ring groove 24 is formed at the leading end of the root 20 in the surface of the nipple 2 and that the bottom surface of the O-ring groove 24 is formed of the polyamide resin. Moreover, the resinous connector according to Example No. 3 is constructed in the same manner as Example No. 1, except that the O-ring groove 24 is formed at the leading end of the root 20 in the surface of the nipple 2 and that the bottom surface and opposite wall surfaces of the O-ring groove 24 are formed of the polyamide resin. Note that the used O-ring 4 is an O-ring with a heavier thickness to such an extent that the depth of the O-ring groove 24 is made deeper in Example Nos. 2 and 3, The resinous connectors according to Example Nos. 3 and 4 can inhibit the O-ring 4 from being twisted or bruised in the same manner as Example No. 1, Hence, the resinous connectors can demonstrate a higher sealing property. Moreover, not only the fatigue-effected decrease in the load for pulling out the hose 5 is inhibited but also the breakage of the root 20 is inhibited in the same manner as Example No. 1.

The present resinous connector can be utilized in the application to fuel tanks as well as in the other various applications by appropriately selecting the first resin and the second resin therefor.

Having now fully described the present invention, it will be apparent to one of ordinary skill in the art that many changes and modifications can be made thereto without departing from the spirit or scope of the present invention as set forth herein including the appended claims.

What is claimed is:

1. A resinous connector, comprising:
    a flange-shaped base welded to a resinous container, in which an opening is formed, wherein the flange-shaped base covers the opening, and an outer periphery of the base is formed of a first resin, which is weldable to the container;
    a nipple extending from the base, wherein the nipple includes:
        a root, which extends from the base, wherein the root has an outer periphery that is formed of the first resin;
        a distal portion, which is distal with respect to the root, wherein at least the distal portion is formed of a second resin, which is more rigid than the first resin;
        sealing projections, which are located on the outer peripheral surface of the distal portion and formed of the second resin, wherein each sealing projection has a substantially triangular cross section such that a diameter of each sealing projection decreases in a direction away from the base, wherein the nipple is press-fitted into a hose such that an outer peripheral surface of the distal portion is fastened to an inner peripheral surface of the hose; and
    an O-ring groove formed in a surface of the nipple adjacent to the root or in the surface of the root; and
    an O-ring located in the O-ring groove between the outer peripheral surface of the nipple and the inner peripheral surface of the hose, such that the O-ring seals between the outer peripheral surface of the nipple and the inner peripheral surface of the hose.

2. The resinous connector set forth in claim 1, wherein the root of the nipple comprises an inner layer that is formed of the second resin.

3. The resinous connector set forth in claim 2, wherein the O-ring groove of the nipple comprises a bottom that is covered with the first resin.

4. The resinous connector set forth in claim 2, wherein the flange-shaped base further comprises an inner layer that is formed of the second resin.

5. The resinous connector set forth in claim 1, wherein the o-ring groove comprises an inner or lower wall that is located a distance of from 5 to 20 mm from the base.

6. The resinous connector set forth in claim 1, wherein the o-ring groove comprises a bottom surface that is formed of the second resin, an inner or lower wall that is formed of the first resin, and an outer or upper wall that is formed of the second resin.

7. The resinous connector set forth in claim 1, wherein the O-ring groove comprises a bottom surface that is formed of the second resin, an inner or lower wall that is formed of the second resin, and an outer or upper wall that is formed of the second resin.

* * * * *